United States Patent
Kim et al.

(10) Patent No.: US 10,218,550 B1
(45) Date of Patent: Feb. 26, 2019

(54) BEAMFORMING TRANSMISSION WITH ANALOG HARDWARE RESOURCE SHARING

(71) Applicant: Mitsubishi Electric Research Laboratories, Inc., Cambridge, MA (US)

(72) Inventors: Kyeong Jin Kim, Lexington, MA (US); Zhengyu Peng, Lubbock, TX (US); Bingnan Wang, Belmont, MA (US); Koon Hoo Teo, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/874,191

(22) Filed: Jan. 18, 2018

(51) Int. Cl.
| | | |
|---|---|---|
| *H03D 3/22* | (2006.01) | |
| *H04L 27/233* | (2006.01) | |
| *H04L 7/027* | (2006.01) | |
| *G01S 3/48* | (2006.01) | |
| *H04B 7/06* | (2006.01) | |

(52) U.S. Cl.
CPC ............ *H04L 27/2334* (2013.01); *G01S 3/48* (2013.01); *H04B 7/0617* (2013.01); *H04L 7/027* (2013.01)

(58) Field of Classification Search
CPC ....... H04L 27/2334; H04L 7/027; G01S 3/48; H04B 7/0617
USPC ....................................................... 375/329
See application file for complete search history.

(56) References Cited

U.S. PATENT DOCUMENTS

| | | | |
|---|---|---|---|
| 9,118,113 B2 | 8/2015 | Mortazawi et al. | |
| 2012/0201258 A1* | 8/2012 | Bendixen | H03F 3/195 370/542 |
| 2012/0220238 A1* | 8/2012 | Hosoya | H04B 7/0695 455/63.4 |
| 2016/0118716 A1* | 4/2016 | Stephenne | H01Q 3/34 342/372 |
| 2016/0381591 A1 | 12/2016 | Lysejko et al. | |

(Continued)

OTHER PUBLICATIONS

Priyanka Das et al., "Hardware Optimized Beam Steering Electronics for MEOLUT Phased Array Antenna." 9th International Radar Symposium India—2013 (IRSI—13), NIMHANS Convention Centre, Bangalore India. Dec. 10-14, 2013.

(Continued)

*Primary Examiner* — Helene Tayong
(74) *Attorney, Agent, or Firm* — Gene Vinokur; James McAleenan; Hironori Tsukamoto

(57) ABSTRACT

A transmitter or receiver including at least one radio-frequency (RF) chain. The RF chain including an array of transmitting elements, each transmitting element includes a band-pass filter and an antenna connected in series for transmitting an analog signal using a beamforming with an angle of departure (AOD) defined by phase shifts of analog signals received by different transmitting elements within the array. A phase shifter to shift a phase of an input signal. A variable gain amplifier (VGA) to change an amplitude of the input signal. A switcher to connect the phase shifter and the VGA to each transmitting element in the array. Wherein at most one transmitting element is connected to the phase shifter and the VGA at a given point of time, such that the switcher is a single-pole-M-throw (SPMT) analog switch. A controller to control the phase shifter, the VGA and the switcher.

18 Claims, 13 Drawing Sheets

(56) References Cited

U.S. PATENT DOCUMENTS

2017/0201275 A1* 7/2017 Tabatabai ............. H04B 1/0475
2017/0353338 A1* 12/2017 Amadjikpe .......... H01Q 9/0407

OTHER PUBLICATIONS

Anil Kumar Pandey., "Solving Electronics Design Challenges of an Aerospace System with EDA Tools." a Research Paper, Publisher: MPIDigest, Publication Date: Mar. 22, 2016.

* cited by examiner

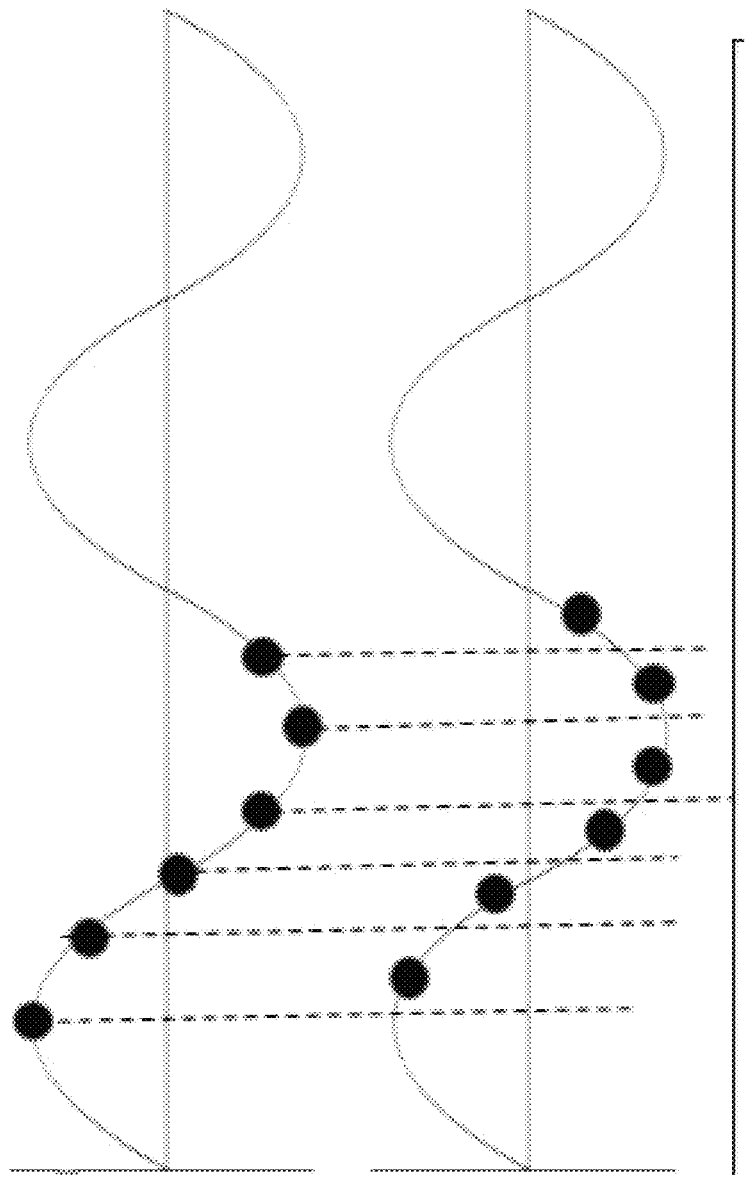

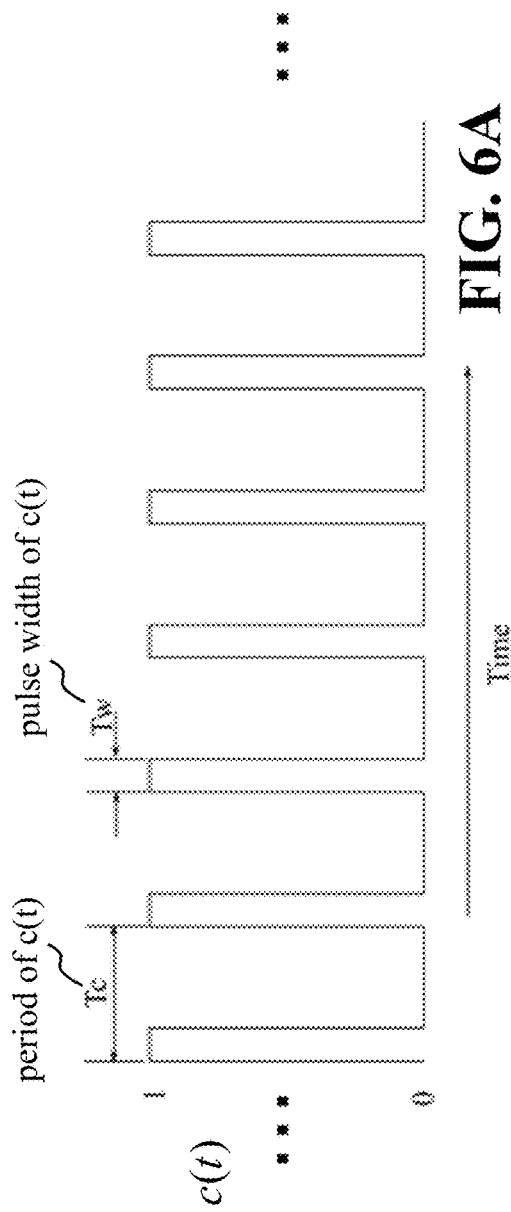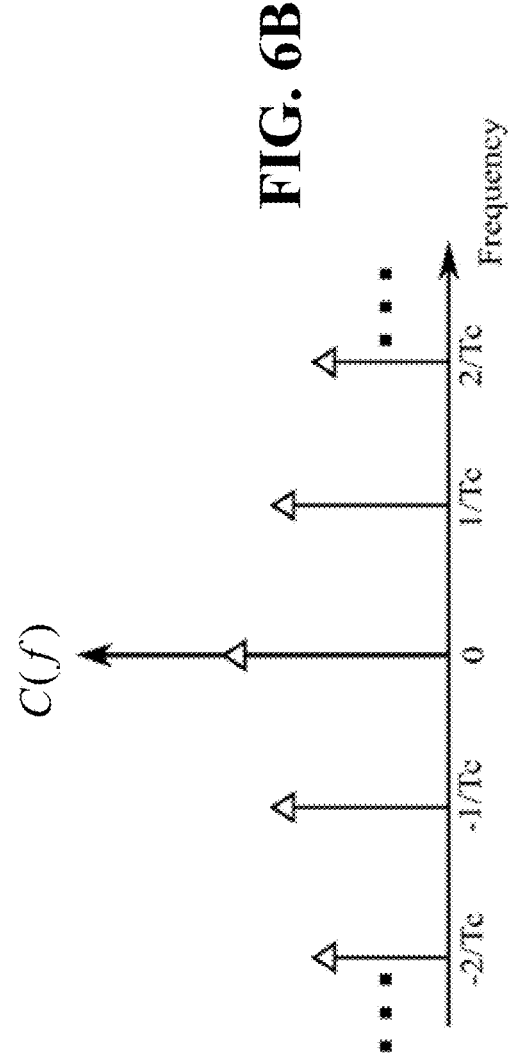
FIG. 6A
FIG. 6B

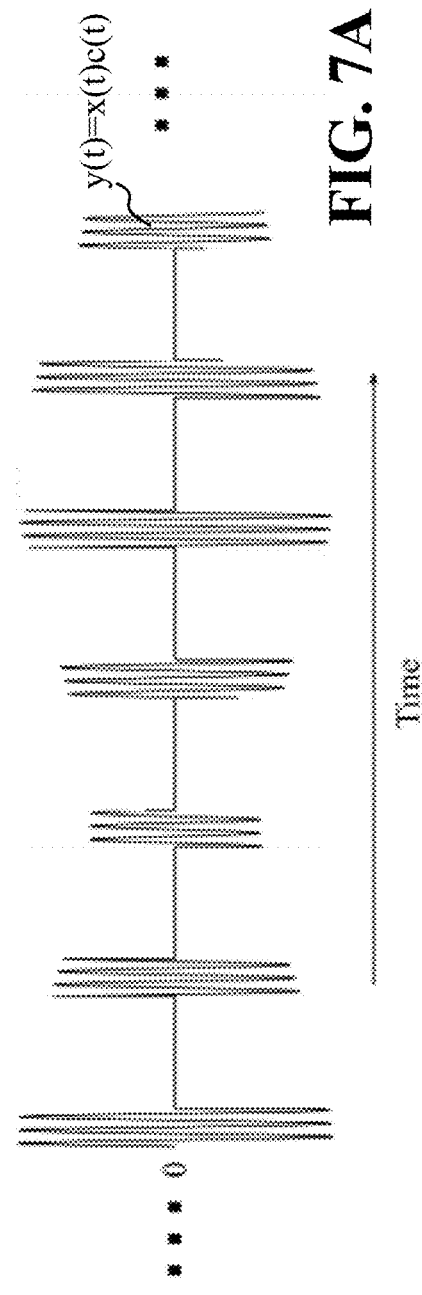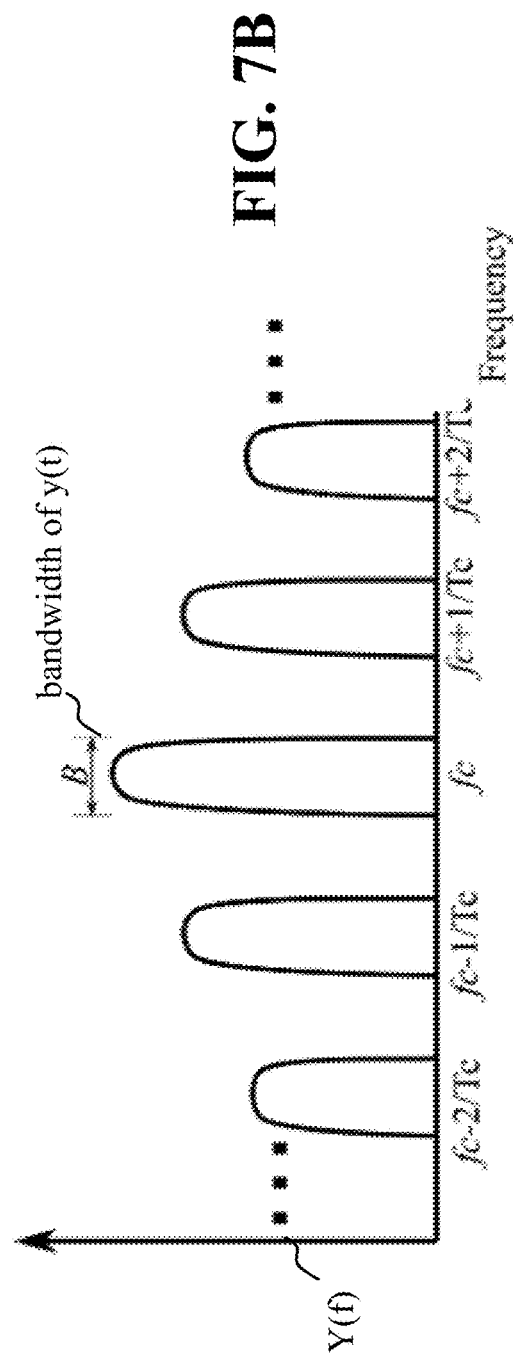

BEAMFORMING TRANSMISSION WITH ANALOG HARDWARE RESOURCE SHARING

FIELD

Embodiments of the present disclosure include devices, methods and systems relating to the field of multiple input, multiple output (MIMO) wireless communication systems, and more particularly to large-scale MIMO wireless communication systems using beamforming transmissions.

BACKGROUND

The term "antenna array" refers to a geometrical arrangement of a number of antenna elements. The antenna elements can be configured as a single antenna unit to achieve a desired antenna gain and directional characteristics, such as a particular radiation pattern. A variation of this radiation pattern can be referred to as beam-forming. Antenna arrays can have applications, such as in multiple-input multiple-output (MIMO) communication systems. In particular, very large antenna arrays can be referred to as "massive MIMO arrays". Massive MIMO arrays may use several hundreds of antenna elements arranged in a single antenna unit and are considered to be a key technology component for future communication systems, such as fifth generation, 5G, communication. According to conventional technology, an up-link MIMO unit may comprise, for example, a radio base-station receiver, an analog-to-digital converter and automatic gain control units.

Massive MIMO can have some advantages, however, these advantages are counteracted, in practice, by an increased hardware complexity associated with having many antennas and many associated up/down conversion chains, and by an increased energy consumption due to all the hardware required for operation.

U.S. Pat. No. 9,705,579 provides a method with a complexity of using a MIMO system, while retaining some benefits as antenna selection, where a subset of size L taken from a set of N available antenna signals is selected and connected, via a switch, to L (L<N) radio-frequency (RF) chains. However, this method fails short in providing an amount of beamforming gain, and thus shows reduced or unacceptable performance, in particular, in channels with small angular spread, which typically occurs in conventional cellular systems.

Accordingly, there is a need to share the hardware resources for beamforming transmission from an array of antennas.

SUMMARY

Embodiments of the present disclosure include devices, methods and systems relating to the field of multiple input, multiple output (MIMO) wireless communication systems, and more particularly to large-scale MIMO wireless communication systems using beamforming transmissions from an array of antennas. Some embodiments provide for reducing the cost of implementation of the MIMO wireless communication system, by sharing analog hardware resources for beamforming transmission from different antennas of the array of antennas. Also, some embodiments include reusing a phase shifter, and/or a variable gain amplifier (VGA) for transmission with multiple antennas within the MIMO wireless communication system.

Initially, the present disclosure addresses aspects of beamforming or spatial filtering through experimentation, wherein beamforming can be appreciated as a signal processing technique used in sensor arrays for directional signal transmission or reception. This can be achieved by combining elements in an antenna array in such a way that signals at particular angles experience constructive interference, while others experience destructive interference. Beamforming can be used at both the transmitting and receiving ends in order to achieve spatial selectivity.

To change the directionality of the array when transmitting, a beamformer can control the phase and relative amplitude of the signal at each transmission, in order to create a pattern of constructive and destructive interference in the wavefront. For example, in a phased array, the power from the transmitter can be fed to the antennas through devices called phase shifters, controlled by a computer system. Wherein the phase shifters controlled by the computer can alter the phase, thus steering the beam of radio waves to a different direction. Similarly, a VGA can control the amplitudes of the signal transmitted from different antennas to focus the formed beam.

Some embodiments are based on an observation that because different antennas need to transmit a signal with a different phase shift and an amplitude at the same time, each antenna needs to be connected to a phase shifter, and a VGA dedicated to that antenna. However, from experimentation an aspect learned is that when a number of antennas increase to reach thousands, e.g., as in the massive MIMO like system, the cost of having thousands phase shifters and VGAs can become impractical.

Some embodiments are based on another realization that in order to reuse the same phase shifter and/or VGA for transmission with multiple antennas, the dependency on concurrent transmission from multiple antennas needs to be broken. While during experimentation this appeared to be non-use information, such that the solution to this problem appeared unrealistic for the analog beamforming of continuous analog signals. However, later in our experimentation the importance of recognition, soon became a realization, wherein some embodiments managed to decouple the time of analog beamforming using the principles borrowed from digital signal processing.

Specifically, in the field of digital signal processing, the sampling theorem is a bridge between continuous-time signals, i.e., the analog signals, and discrete-time signals, e.g., digital signals. The sampling theorem establishes a sufficient condition for a sample rate that permits a discrete sequence of samples to capture all the information from a continuous-time signal of finite bandwidth.

Wherein, some embodiments are based on the realization that the samples in that discrete sequence of samples are separated by a time period governed by the sampling frequency. If the discrete sequence of samples is shifted within the limits of the time period, both discrete sequence of samples (the original sequence and the shifted one), represents the analog signal in its entirety and the same analog signal can be reconstructed from either one or both of the two discrete sequence of samples. However, because those two discrete sequence of samples are shifted in time, at each point of time only one sample can be processed, which allows the same phase shifter and/or VGA, to process samples of different sequences of samples.

Further, some embodiments are based on a realization that a switcher may be used in directing an input signal to different antennas, serves as a sampler of the input signal. To that end, if the phase shifter and/or VGA are arranged on a path of the input signal before the switcher, then the phase shifter and/or VGA can modify the input signal with values required for currently connected, i.e., active, antenna. Such that, when the switcher connects the pass of the input signal to a different antenna, the phase shifter and/or VGA can rapidly change their control to the values of that different antenna. After the sampling, the discrete sequence of samples submitted to each antenna can be converted to analog signal by individual band-pass filters.

Accordingly, one embodiment discloses at least one transmitter including at least one radio-frequency (RF) chain. The RF chain can include an array of transmitting elements, such that each transmitting element includes a band-pass filter and an antenna connected in series for transmitting an analog signal using a beamforming with an angle of departure (AOD) defined by phase shifts of analog signals received by different transmitting elements. The RF chain also includes a phase shifter to shift a phase of an input signal and a variable gain amplifier to change an amplitude of the input signal. The phase shifter and the variable gain amplifier are connected in series.

The RF chain can also include a switcher to connect the phase shifter and the variable gain amplifier to each transmitting element in the array of transmitting elements. The switcher can be a single-pole-M-throw (SPMT) analog switch, wherein M is the size of the array of transmitting elements, such that at most one transmitting element is connected to the phase shifter and the variable gain amplifier at a given point of time.

The operation of the RF chain can be controlled by a controller to control one or combination of, the phase shifter, the variable gain amplifier or the switcher. Wherein, at the given point of time, the transmitting element receives a sample of the input signal having a phase and an amplitude determined based on the AOD and a place of the transmitting element within the array of transmitting elements.

For example, in one embodiment, the controller, in response to receiving the AOD, can determine a phase shift value and an amplitude value for each transmitting element in the array of transmitting elements to form a sequence of phase shift values and a sequence of amplitude values. Those two sequences correspond to a sequence of states of the switcher connecting the phase shifter to different transmitting elements. For example, the sequence of states of switcher can be predetermined and stored in a memory operatively connected to the controller. In such a manner, the sequence of phase shift values and the sequence of amplitude values are synchronized with the operations, i.e., states, of the switcher allowing the controller to control, at each control step, the phase shifter to change the phase of the input signal according to the sequence of phase shift values and to control, at each control steps, the variable gain amplifier to change the amplitude of the input signal according to the sequence of amplitude values. The control steps have the same frequency as the frequency of the switcher.

Further, for transmitting the signal with the AOD, the controller determines the sequence of M phase shift values for the sequence of M antennas in the array of antennas. If the AOD remains constant for a period of transmission, the controller duplicates of the M phase shift values to form the sequence of phase shift values for the period of transmission. In such a manner, the sequence of phase shift values includes phase shift values for all antennas in the array of antennas. In some embodiments, the phase values for different antennas are alternating according to the switching order, i.e., according to the sequence of states of the switcher. In one embodiment, the sequence of amplitude values can be determined in a manner similar to the determination of the sequence of phase shift values.

In one embodiment, each RF chain can include a power amplifier connected in series to the phase shifter and the variable gain amplifier on the path of the input signal before the switcher. Such a configuration allows reusing the power amplifier for transmission from multiple antennas. In alternative embodiment, each transmitting element can include a power amplifier connected in series to the band-pass filter and the antenna, i.e., on the path of the input signal after the switcher. At least one aspect of this embodiment, is reducing the requirement of frequency of operation of the power amplifier.

Each RF chain can include an array of M transmitting elements. The size M of the array of transmitting elements can be determined by a frequency of the switcher. For example, the size M of the array of transmitting elements is less than a frequency of the switcher divided by the bandwidth of the input signal, as governed by the sampling theorem.

According to an embodiment of the present disclosure, a transmitter including at least one radio-frequency (RF) chain. The RF chain including an array of transmitting elements. Wherein each transmitting element includes a band-pass filter and an antenna connected in series for transmitting an analog signal using a beamforming with an angle of departure (AOD) defined by phase shifts of analog signals received by different transmitting elements within the array of transmitting elements. A phase shifter to shift a phase of an input signal. A variable gain amplifier (VGA) to change an amplitude of the input signal, wherein the phase shifter and the VGA are connected in series. A switcher to connect the phase shifter and the VGA to each transmitting element in the array of transmitting elements. Wherein at most one transmitting element is connected to the phase shifter and the VGA at a given point of time, such that the switcher is a single-pole-M-throw (SPMT) analog switch, wherein M is a size of the array of transmitting elements. A controller to control the phase shifter, the VGA and the switcher, such that, at the given point of time, the transmitting element receives a sample of the input signal having a phase and an amplitude determined based on the AOD, and a place of the transmitting element within the array of transmitting elements.

According to an embodiment of the present disclosure, a method for transmitting an analog signal by an array of antennas using a beamforming with an angle of departure (AOD) defined by phase shifts of the analog signals transmitted by different antennas. The method including determining a phase shift value and an amplitude value for each antenna in the array of antennas based on the AOD and a place of each antenna in the array. Ordering the phase shift values according to a sequence of activation of the antennas in the array to form a sequence of phase shifts. Ordering the amplitude values according to the sequence of activation of the antennas in the array to form a sequence of amplitudes. Modifying the phase and the amplitude of an analog signal according to values in the sequence of phase shifts and in the sequence of amplitudes. Sampling the modified analog signal and directing the samples to different antennas in an order governed by the sequence of activation of the antennas. Band-passing each sample directed to each antenna to produce a modified copy of the analog signal for each antenna. Transmitting the modified copies of the analog signal from the corresponding antennas.

According to an embodiment of the present disclosure, a transmitter including at least two radio-frequency (RF)

chains. The transmitter including each RF chain having an array of transmitting elements. Wherein each transmitting element includes a band-pass filter and an antenna connected in series for transmitting an analog signal using a beamforming with an angle of departure (AOD) defined by phase shifts of analog signals received by different transmitting elements within the array of transmitting elements. A phase shifter to shift a phase of an input signal. A variable gain amplifier (VGA) to change an amplitude of the input signal, wherein the phase shifter and the VGA are connected in series. A switcher to connect the phase shifter and the VGA to each transmitting element in the array of transmitting elements. Wherein at most one transmitting element is connected to the phase shifter and the VGA at a given point of time, such that the switcher is a single-pole-M-throw (SPMT) analog switch, wherein M is the size of the array of transmitting elements. A controller to control the at least two RF chains, by controlling at least two phase shifters, at least two VGAs, and at least two switchers, such that, at the given point of time, at least two transmitting elements from the at least two RF chains, receive a sample of the input signal having a phase and an amplitude determined based on the AOD of the array, and a place of the at least two transmitting elements within the array of transmitting elements of the at least two RF chains.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1D shows one analog waveform is sampled by two discrete sampling sequences with a time shift, according to some embodiments of the present disclosure;

FIG. 6A is a schematic illustrating a waveform of a periodic signal c(t), which is a square wave, wherein this signal can be used as a time control signal, according to embodiments of the present disclosure;

FIG. 6B is a schematic illustrating the spectrum, C(f), of c(t) of FIG. 6A, in a frequency domain, according to embodiments of the present disclosure;

FIG. 7A is a schematic illustrating the signal y(t)=x(t)c(t), having only a limited time duration, $T_w$, x(t) that is transmitting, according to embodiments of the present disclosure;

FIG. 7B is a schematic illustrating the spectrum, Y(f), of y(t) in the frequency domain, according to embodiments of the present disclosure;

Figure 1A:
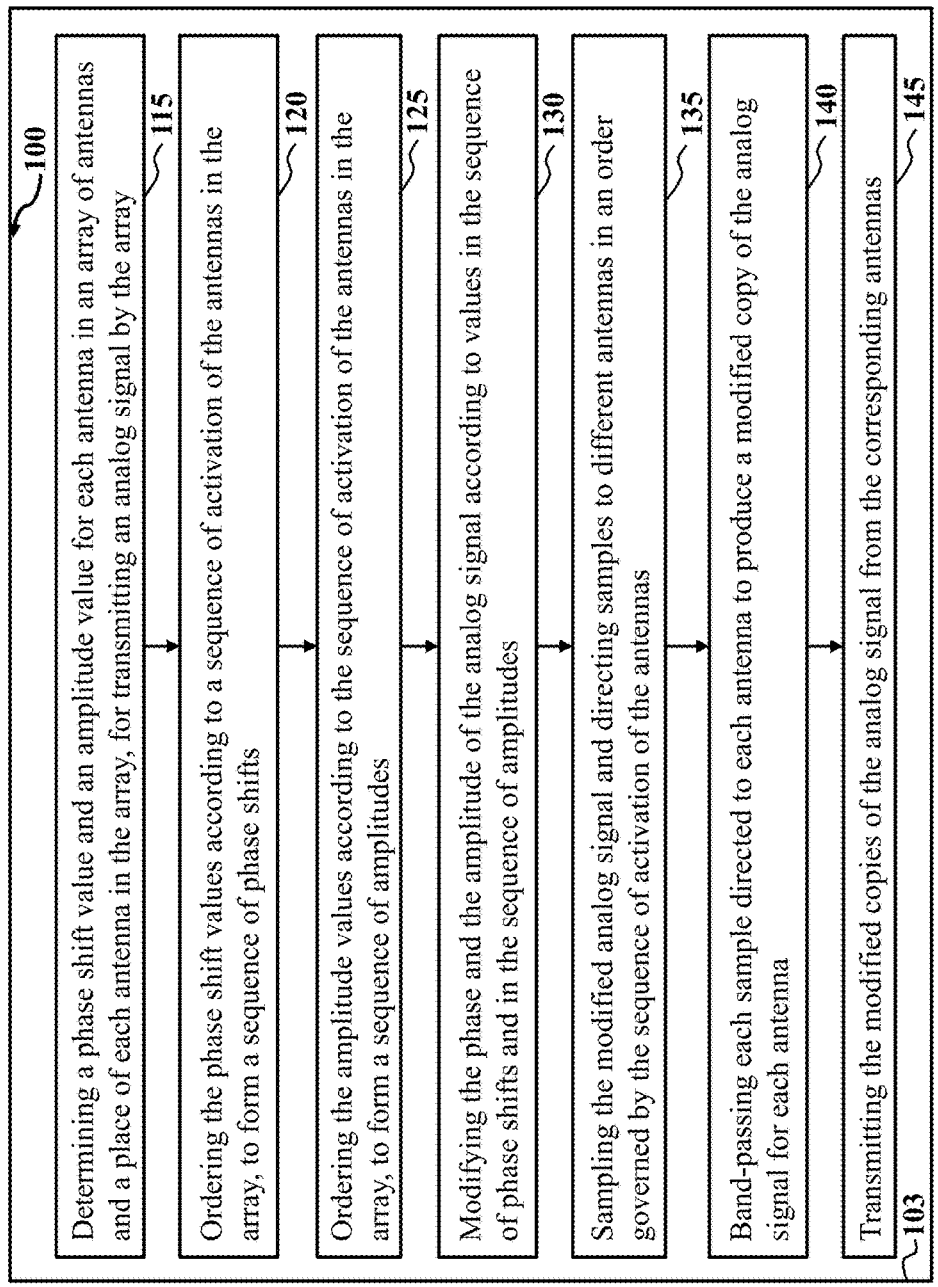
FIG. 1A illustrates a block diagram of some methods of an embodiment for a wireless communication system using beamforming transmissions, according to one embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

Embodiments of the present disclosure include devices, methods and systems relating to the field of multiple input, multiple output (MIMO) wireless communication systems, and more particularly to large-scale MIMO wireless communication systems using beamforming transmissions from an array of antennas. Some embodiments provide for reducing the cost of implementation of the MIMO wireless communication system, by sharing analog hardware resources for beamforming transmission from different antennas of the array of antennas. Also, some embodiments include reusing a phase shifter, and/or a variable gain amplifier (VGA) for transmission with multiple antennas within the MIMO wireless communication system, i.e. a reducing method for hardware structures via hardware sharing.

Specifically, embodiments of the present disclosure include a hardware resource sharing analog beamforming transceiver structure that can have a transmitter antenna array and a receiver antenna array. For the transmitter array, some embodiments can have a one channel modulated or unmodulated radio frequency (RF) signal divided in N channel signals by time division multiplexing. Each channel can include a phase shifter, a variable gain amplifier, other necessary signal conditioning components, and a single-pole-M-throw (SPMT) analog switch. The SPMT analog switch can also be connected with M signal paths, wherein for each signal path, there are a band-pass filter and an antenna. On the receiver array, some embodiments can have L×K antennas that are grouped into L groups, wherein each group includes K antennas. The K antennas can be connected with a K-throw-single pole (KTSP) analog switch. The common port of the KTSP analog switch can be connected with a band-pass filter, a low noise amplifier, a phase shifter, a variable gain amplifier, a down-conversion circuit, a low-pass filter, an analog-to-digital convertor and a digital processor.

Accordingly, the embodiments of the present disclosure are based on many realizations identified through experimentation, along with observations made while going through the experimentation process. For example, some embodiments are based on the observation that because different antennas need to transmit a signal with a different phase shift and an amplitude at the same time, each antenna needs to be connected to a phase shifter, and a VGA dedicated to that antenna. However, from experimentation, an aspect learned is that when a number of antennas increase to reach thousands, e.g., as in the massive MIMO like system, the cost of having thousands phase shifters and VGAs can become impractical.

For example, experimentation started with an analog beamformer controlling the phase and relative amplitude of the signal at each transmission, in order to create a pattern of constructive and destructive interference in the wavefront. Such that, in a phased array, the power from the transmitter is fed to the antennas through devices called phase shifters, controlled by a computer system, which can alter the phase, thus steering the beam of radio waves to a different direction. Similarly, VGA controls the amplitudes of the signal transmitted from different antennas to focus the formed beam. However, because different antennas need to transmit a signal with different phase shift and an amplitude at the same time, each antenna needed to be connected to a phase shifter and VGA dedicated to that antenna. Thus, it was learned that when a number of antennas increase to reach thousands, e.g., as in the massive MIMO like system, the cost of having thousands phase shifters and VGAs can become impractical.

From experimentation we further learned that at least one proposed solution used less antennas than available to communicate information, but that such a solution did not provide for the same amount of beamforming gain as in a MIMO system, or like system, having one RF chain per antenna. Potentially, the cause of the problem may be the dependency on concurrent transmission from multiple antennas that needed to be broken, which seemed unrealistic for the analog beamforming of continuous analog signals, if the thought is that time is a continuous matter. However, the realization was discovered that in order to reuse the same phase shifter and/or VGA for transmission with multiple antennas, the dependency on concurrent transmission from multiple antennas needed to be broken. Where, some embodiments during experimentation managed to decouple the time of analog beamforming, which was achieved using principles borrowed from digital signal processing, along with the observations made during experimentation.

Specifically, in the field of digital signal processing, the sampling theorem is a bridge between continuous-time signals, i.e., the analog signals, and discrete-time signals, e.g., digital signals. The sampling theorem establishes a sufficient condition for a sample rate that permits a discrete sequence of samples to capture all the information from a continuous-time signal of finite bandwidth.

Wherein, some embodiments are based on the realization that the samples in that discrete sequence of samples are separated by a time period governed by the sampling frequency. If the discrete sequence of samples is shifted within the limits of the time period, both discrete sequence of samples (the original sequence and the shifted one), represents the analog signal in its entirety and the same analog signal can be reconstructed from either one or both of the two discrete sequence of samples. However, because those two discrete sequence of samples are shifted in time, at each point of time only one sample can be processed, which allows the same phase shifter and/or VGA, to process samples of different sequences of samples.

Further, some embodiments present solutions of the problem based on a realization that a switcher may be used in directing an input signal to different antennas, serves as a sampler of the input signal. To that end, if the phase shifter and/or VGA are arranged on a path of the input signal before the switcher, then the phase shifter and/or VGA can modify the input signal with values required for currently connected, i.e., active, antenna. Such that, when the switcher connects the pass of the input signal to a different antenna, the phase shifter and/or VGA can rapidly change their control to the values of that different antenna. After the sampling, the discrete sequence of samples submitted to each antenna can be converted to analog signal by individual band-pass filters.

Further, one embodiment discloses at least one transmitter including at least one radio-frequency (RF) chain. The RF chain can include an array of transmitting elements, such that each transmitting element includes a band-pass filter and an antenna connected in series for transmitting an analog signal using a beamforming with an angle of departure (AOD) defined by phase shifts of analog signals received by different transmitting elements. The RF chain also includes a phase shifter to shift a phase of an input signal and a variable gain amplifier to change an amplitude of the input signal. The phase shifter and the variable gain amplifier are connected in series.

The RF chain can also include a switcher to connect the phase shifter and the variable gain amplifier to each transmitting element in the array of transmitting elements. The switcher can be a single-pole-M-throw (SPMT) analog switch, wherein M is the size of the array of transmitting elements, such that at most one transmitting element is connected to the phase shifter and the variable gain amplifier at a given point of time.

The operation of the RF chain can be controlled by a controller to control one or combination of, the phase shifter, the variable gain amplifier or the switcher. Wherein, at the given point of time, the transmitting element receives a sample of the input signal having a phase and an amplitude determined based on the AOD and a place of the transmitting element within the array of transmitting elements. For example, in one embodiment, the controller, in response to receiving the AOD, can determine a phase shift value and an amplitude value for each transmitting element in the array of transmitting elements to form a sequence of phase shift values and a sequence of amplitude values. Those two sequences correspond to a sequence of states of the switcher connecting the phase shifter to different transmitting elements. For example, the sequence of states of switcher can be predetermined and stored in a memory operatively connected to the controller. In such a manner, the sequence of phase shift values and the sequence of amplitude values are synchronized with the operations, i.e., states, of the switcher allowing the controller to control, at each control step, the phase shifter to change the phase of the input signal according to the sequence of phase shift values and to control, at each control steps, the variable gain amplifier to change the amplitude of the input signal according to the sequence of amplitude values. The control steps have the same frequency as the frequency of the switcher.

Further, for transmitting the signal with the AOD, the controller determines the sequence of M phase shift values for the sequence of M antennas in the array of antennas. If the AOD remains constant for a period of transmission, the controller duplicates of the M phase shift values to form the sequence of phase shift values for the period of transmission. In such a manner, the sequence of phase shift values includes phase shift values for all antennas in the array of antennas. In some embodiments, the phase values for different antennas are alternating according to the switching order, i.e., according to the sequence of states of the switcher. In one embodiment, the sequence of amplitude values can be determined in a manner similar to the determination of the sequence of phase shift values.

In one embodiment, each RF chain can include a power amplifier connected in series to the phase shifter and the variable gain amplifier on the path of the input signal before the switcher. Such a configuration allows reusing the power amplifier for transmission from multiple antennas. In alternative embodiment, each transmitting element can include a power amplifier connected in series to the band-pass filter and the antenna, i.e., on the path of the input signal after the switcher. At least one aspect of this embodiment, is reducing the requirement of frequency of operation of the power amplifier.

Each RF chain can include an array of M transmitting elements. The size M of the array of transmitting elements can be determined by a frequency of the switcher. For example, the size M of the array of transmitting elements is less than a frequency of the switcher divided by the bandwidth of the input signal, as governed by the sampling theorem.

FIG. 1A illustrates a block diagram of some methods of an embodiment for a wireless communication system using beamforming transmissions, according to one embodiment of the present disclosure. Method 100 is for transmitting an analog signal by an array of antennas using a beamforming with an angle of departure (AOD) defined by phase shifts of the analog signals transmitted by different antennas. The method 100 can be implemented with a controller 103 that could include a memory. The wireless communication system can be multiple input and multiple output (MIMO) wireless communication systems, including large-scale MIMO wireless communication systems using beamforming transmissions from an array of antennas. Wherein the MIMO wireless communication system can share analog hardware resources for beamforming transmission from different antennas of the array of antennas.

Step 115 of FIG. 1A for method 100 can include determining a phase shift value and an amplitude value for each antenna in the array of antennas based on the AOD, and a place of each antenna in the array.

Step 120 of FIG. 1A for method 100 can include ordering the phase shift values according to a sequence of activation of the antennas in the array to form a sequence of phase shifts.

Step 125 of FIG. 1A for method 100 can include ordering the amplitude values according to the sequence of activation of the antennas in the array to form a sequence of amplitudes.

Step 130 of FIG. 1A for method 100 can include modifying the phase and the amplitude of an analog signal according to values in the sequence of phase shifts and in the sequence of amplitudes.

Step 135 of FIG. 1A for method 100 can include sampling the modified analog signal and directing the samples to different antennas in an order governed by the sequence of activation of the antennas.

Step 140 of FIG. 1A for method 100 can include band-passing each sample directed to each antenna to produce a modified copy of the analog signal for each antenna.

Step 145 of FIG. 1A for method 100 can include transmitting the modified copies of the analog signal from the corresponding antennas.

Figure 1B:
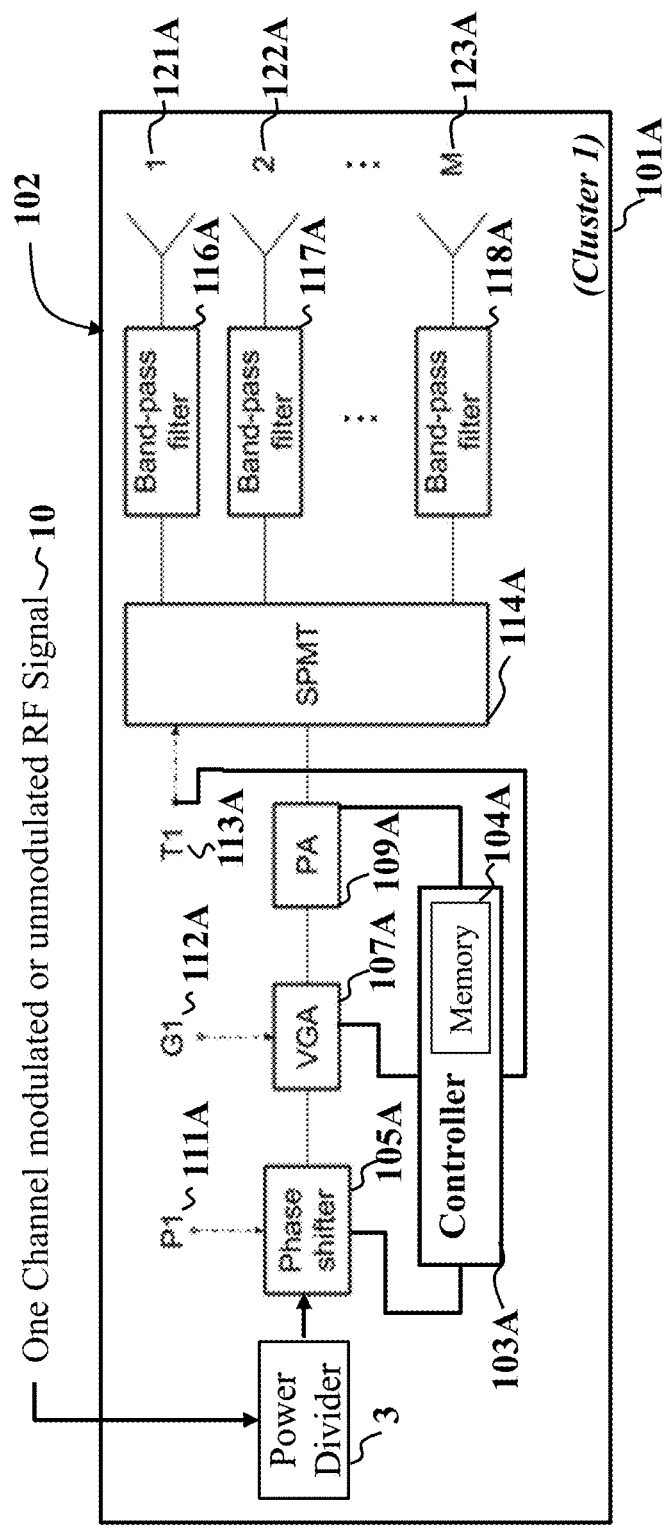
FIG. 1B shows a schematic of a wireless communication system including some components, according to some embodiments of the present disclosure.
Figure 1C:
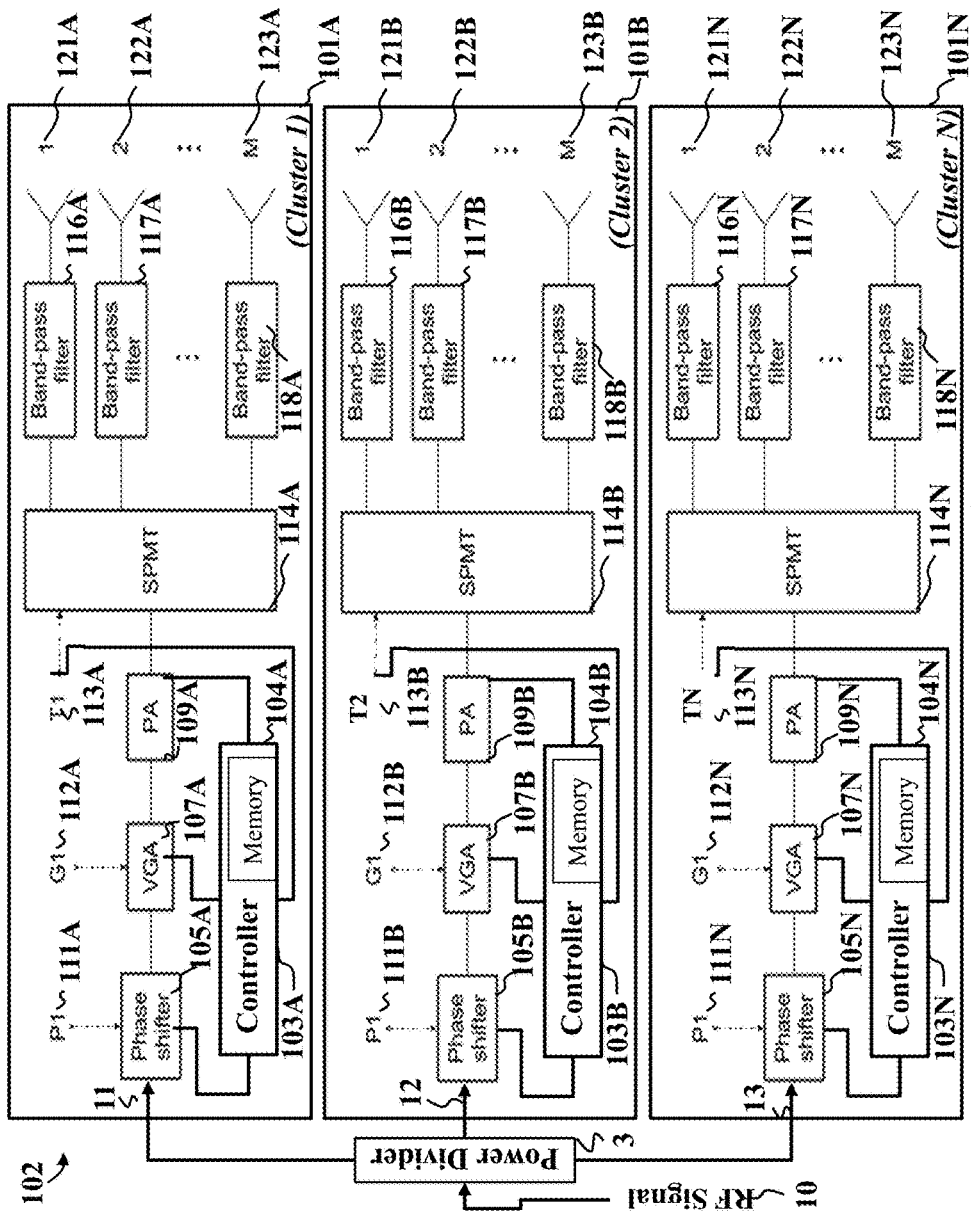
FIG. 1C shows a schematic of another wireless communication system including multiple components, according to some embodiments of the present disclosure.

FIG. 1B shows a schematic of a wireless communication system including some components, according to some embodiments of the present disclosure. FIG. 1C shows a schematic of the wireless communication system of FIG. 1B, that includes multiple clusters in a cluster-based transmitter architecture, according to some embodiments of the present disclosure.

FIG. 1B and FIG. 1C illustrate a cluster-based transmitter architecture 102, according to the present disclosure. FIG. 1B shows a single cluster of the cluster-based transmitter architecture 102, and FIG. 1C shows multiple clusters of the cluster-based transmitter architecture 102.

For example, FIG. 1B shows cluster 101A, composed of a phase shifter 105A, a variable gain amplifier (VGA) 107A, a power amplifier (PA) 109A, a time scheduling signal (T1) 113A, and a single-pole-M-throw (SPMT) analog switch 114A. The use of a group of antenna elements in a single cluster 101A, P1 and G1 denote a set of M phase shifts (P1) 111A and VGA gains (G1) 112A. Wherein, they are stored in an individual memory 104A in the controller 103A.

FIG. 1C shows multiple clusters 101A, 101B, 101N of the cluster-based transmitter architecture 102. The architecture divides N×M antenna elements into N clusters 101A, 101B, 101N, such that each cluster is composed of M antenna elements. For example, the use of a group of antenna elements in each cluster 101A, 101B, 101N, P1 and G1 denote a set of M phase shifts (P1) 111A, 111B, 111N and VGA gains (G1) 112A, 112B 112N. They can be stored in separate memories 104A, 104B, 104N in the controller 103A, 103B, 103N.

FIG. 1C illustrates that every cluster 101A, 101B, 101N can have the same structure with different memories 104A, 104B, 104N for the phase shifts P1 111A, 111B, 111N and VGA gains G2 112A, 112B, 112N. By virtue of SPMT, 114A, 114B, 114N, the input RF signal, 11, 12, 13, from a power divider 3, can feed M antennas after applying some RF operations and passing through a band-pass-filter 116A, 117A, 118A, 116B, 117B, 118B, 116N, 117N, 118N.

FIG. 1D shows one analog waveform is sampled by two discrete sampling sequences with a time shift, according to some embodiments of the present disclosure.

To better understand FIG. 1D and FIG. 1C operation, it is important to review some of the realizations learned through experimentation. What was realized was that there is the possibility to decouple the time dependency of analog beamforming using the principles borrowed from digital signal processing. For example, the present disclosure sampling theorem establishes a sufficient condition for a sample rate permitting a discrete sequence of samples to capture all the information from a continuous signal. If the discrete sequence of samples is shifted within the limits of time period of the sampling rate, both discrete sequence of samples (the original sequence and the shifted one) represent the analog signal in its entirety, and the same analog signal can be reconstructed from either one or both of the two discrete sequence of samples. Another realization discovered is that because those two discrete sequence of samples are shifted in time, at each point of time, only one sample is processed, which allows the same phase shifter and/or VGA to process samples of different sequences of samples. Thus, at least one solution included embodiments having the switcher directing an input signal to different antennas serves as a sampler of the input signal. To that end, if the phase shifter and/or VGA are arranged on a path of the input signal before the switcher, the phase shifter and/or VGA can modify the input signal with values required for currently connected, i.e., active, antenna. Wherein, after the sampling, the discrete sequence of samples submitted to each antenna can be converted to analog signal by individual band-pass filters.

Figure 2:
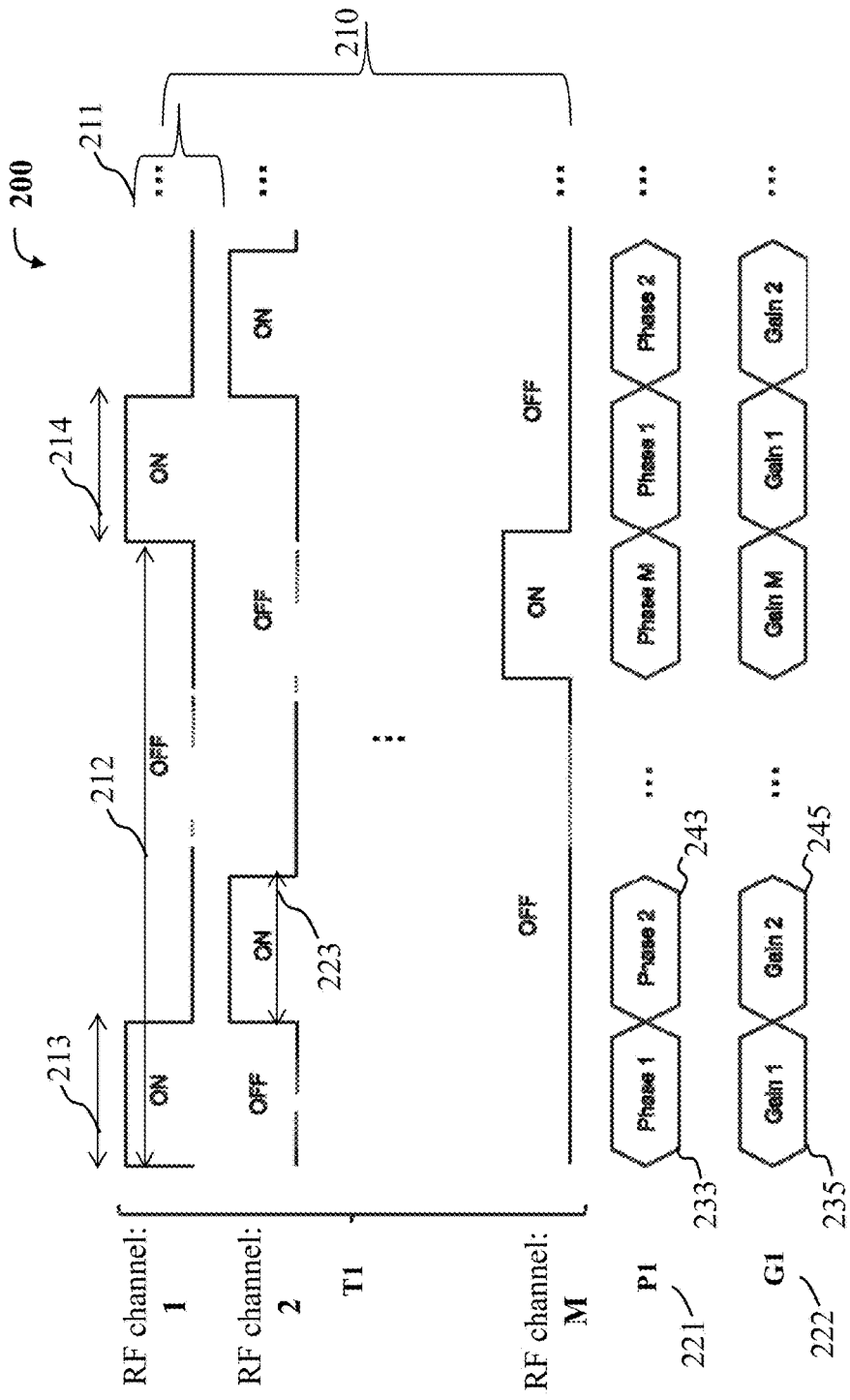
FIG. 2 is a schematic illustrating a transmitter control sequence, at a particular time, such that just one RF channel out of the M channels is activated, according to embodiments of the present disclosure.

FIG. 2 is a schematic illustrating a transmitter control sequence, at a particular time, such that just one RF channel out of the M channels is activated, according to embodiments of the present disclosure. A set of timing signals 210, denotes a set of time schedules for all RF channel of cluster 1, 101A. For example, 211 is for a time schedule for RF channel 1. It specifies the time duration when a particular phase and gain are activated for a particular RF channel for the beamforming pattern computation. For example, for a time duration 213, only phase 1, 233, and gain 1, 235, are used for the computation of $g_1 e^{jc_1\theta_1}$ for RF channel 1, where $c_1$ is the beamforming constant depending on the index of the channel, wavelength, and distance between two antenna elements. In the next time duration 223, only phase 2, 243, and gain 2, 245, are activated for the computation of $g_2 e^{jc_2\theta_2}$ for RF channel 2, where $c_2$ is the beamforming constant depending on the index of the RF channel, wavelength, and distance between antenna elements. After finishing all these computations, the operation for RF channel 1 is reactivated again at time duration 214. Using this time division multiplexing, only one phase shifter and VGA are necessary in each of the clusters. However, to generate the same beamforming by time division de-multiplexed combining as the prior art approach, the time of interval, 212, should be determined by the beamforming bandwidth.

Figure 3:
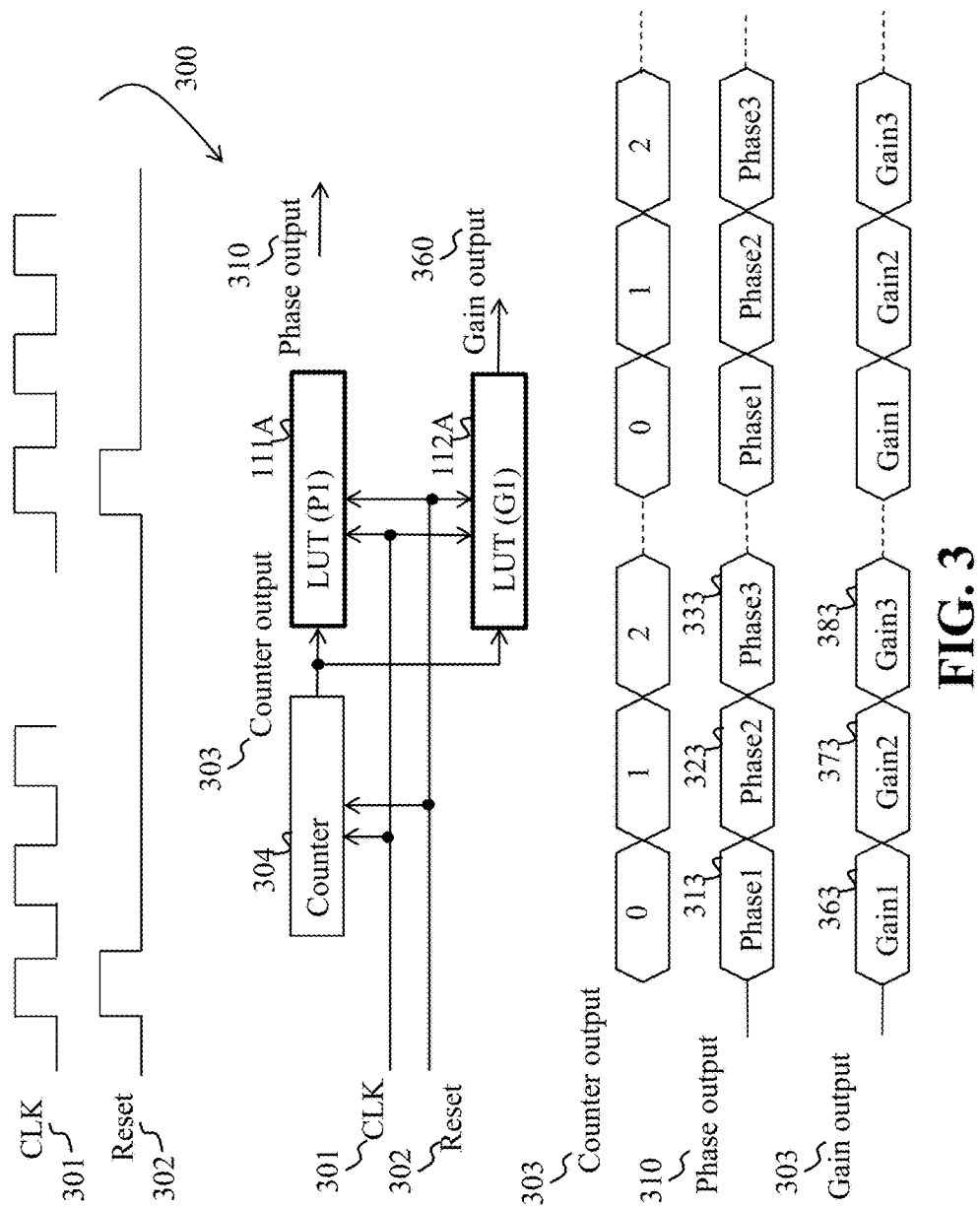
FIG. 3 is a schematic illustrating some control signals for T1, such that the clock signal outputs will be used as an address input of the memory similar to look-up-tables (LUTs), according to embodiments of the present disclosure.

FIG. 3 is a schematic illustrating some control signals for T1, such that the clock signal outputs will be used as an address input of the memory similar to look-up-tables (LUTs), according to embodiments of the present disclosure.

For example, more description of FIG. 2 is provided by using FIG. 3. For the clock signal 301, and reset signal 302, the counter 304, counter outputs 303. These counter outputs 303 will be used as an address input of the memory as a kind of look-up-tables (LUTs) 111,112. These two LUTs 111,112 hold a set of the phase outputs 310, and gain outputs 360. Synchronized by clock and reset signals, LUTs can generate a desired phase 313, 323, 333, . . . , and gain, 363, 373, 383, . . . etc. Similar timing scheduling is used for T2 113B and TN 113N.

Figure 4:
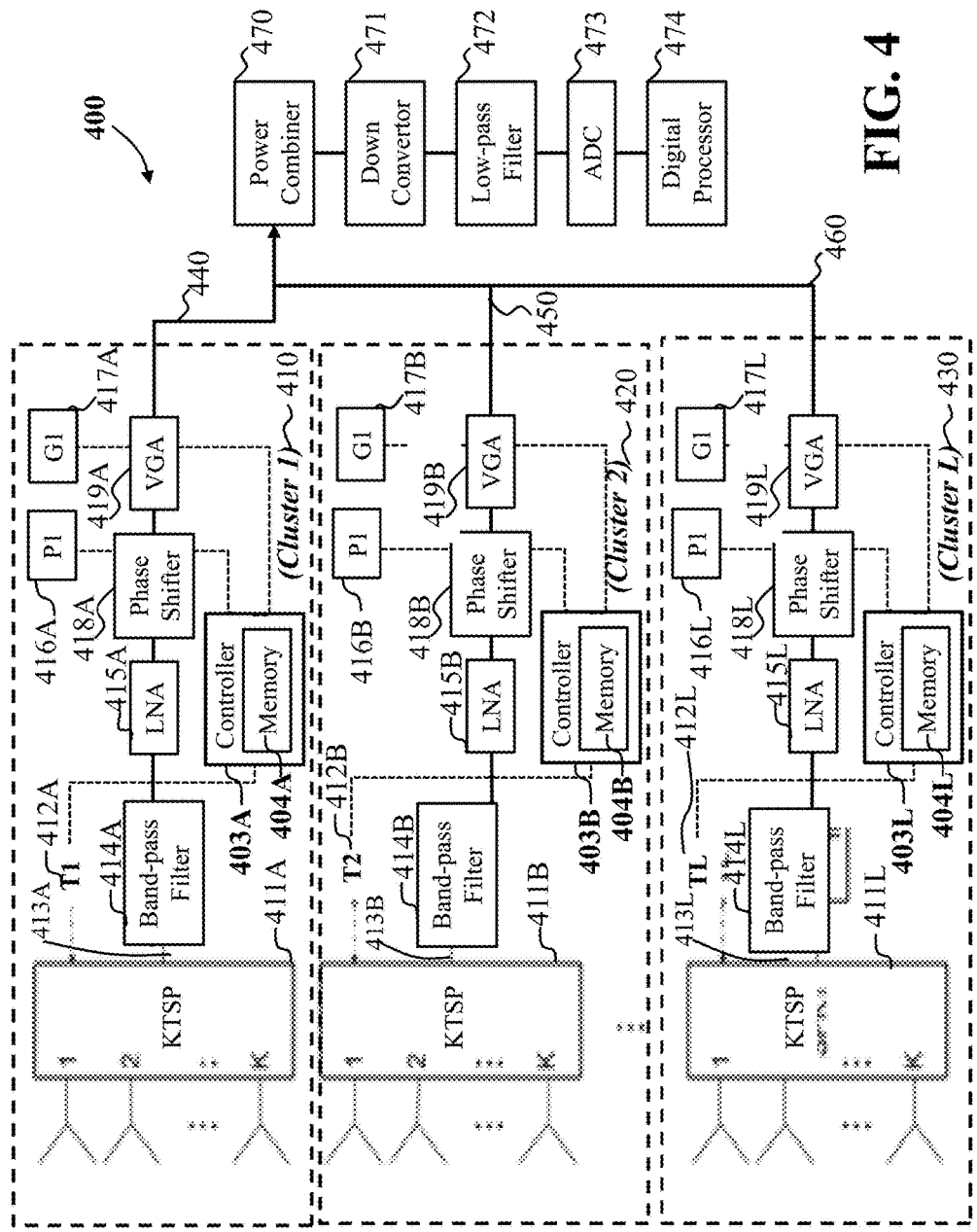
FIG. 4 shows a schematic of another wireless communication system including multiple components, according to embodiments of the present disclosure.

FIG. 4 illustrate a cluster-based receiver architecture, according to embodiments of the present disclosure; and FIG. 4 shows a cluster-based receiver architecture 400. In FIG. 4, the clusters 1, 2 and L, 410, 420, 430 are all about the same structure for this specific application. Receiver cluster 1, 410 can be comprised of K receive antenna elements. Wherein, only one receive antenna, out of the K receive antennas, will be selected by the K-throw-single pole (KTSP) analog switch 411A. Since there are L clusters in the receiver, L antennas are simultaneously selected for receive beamforming. For the analog switch output 413A, then this particular embodiment applies band-pass filter 414A, LNA 415A, phase shifter 418A, and VGA 419A. As in the transmitter 102, we have two LUTs, 416A, and 417A, holding phases and gains which are uniquely used by a selected receive antenna. The selection of a particular phase and gain is specified by the control signal T1, 412A. Similarly, other clusters are also provided by T2, 412B and TL, 412L.

Receiver cluster 2, 420 and cluster L, 430, can be comprised of K receive antenna elements. Wherein, only one receive antenna, out of the K receive antennas, will be selected by the K-throw-single pole (KTSP) analog switch 411B, 411L. Since there are L clusters in the receiver, L antennas are simultaneously selected for receive beamforming. For the analog switch output 413B, 413L, then this particular embodiment applies band-pass filter 414B, 414L, LNA 415B, 415L, phase shifter 418B, 418L, and VGA 419B, 419L. As in the transmitter 102, we have two LUTs, 416B, 416L, and 417B, 417L, holding phases and gains which are uniquely used by a selected receive antenna. The selection of a particular phase and gain is specified by the control signal T2, 412B, TL, 412L.

For this particular embodiment, the same time scheduling can be as in FIG. 2, 200 and FIG. 3, 300. The outputs from the L clusters 440, 450, 460, are combined by power combiner 470. After applying down conversion by 471, low-pass filtering 472, analog-to-digital convention 473, the beamforming signal in the base band can be used in the digital processor 474. In each cluster 440, 450, 460, a controller 403A, 403B, 403L provides timing sequences. Its period is stored in the memory 404A, 404B, 404L installed inside of the controller 403A, 403B, 403L.

Principles

Figure 5A:
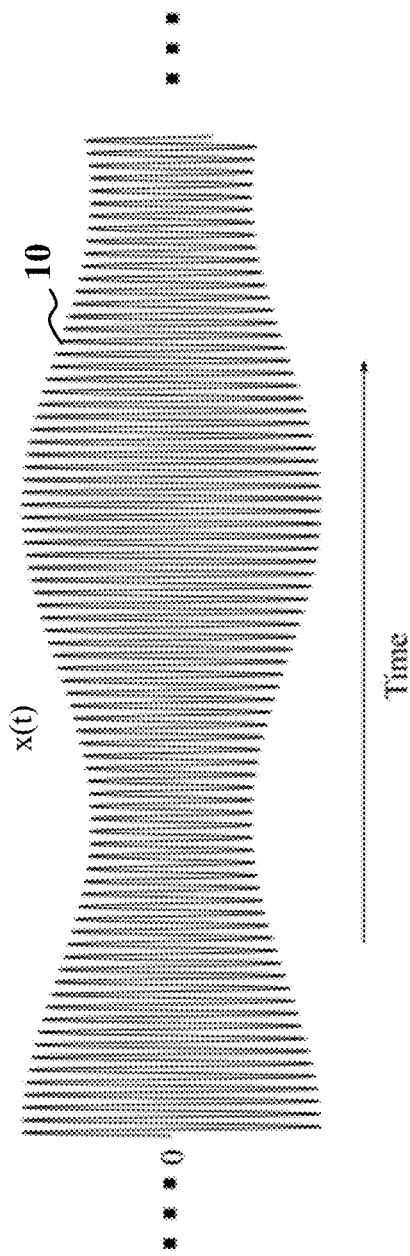
FIG. 5A is a schematic illustrating an RF signal x(t) having a bandwidth of B Hz, and a center frequency $f_c$, according to embodiments of the present disclosure.

FIG. 5A to FIG. 9 address some principles learned during experimentation and applied to some of the embodiments, according to the present disclosure. For example, FIG. 5A is a schematic illustrating an RF signal x(t) having a bandwidth of B Hz, and a center frequency $f_c$, according to embodiments of the present disclosure.

Wherein, x(t) represents the one channel modulated or unmodulated RF signal 10 in FIG. 1C.

Figure 5B:
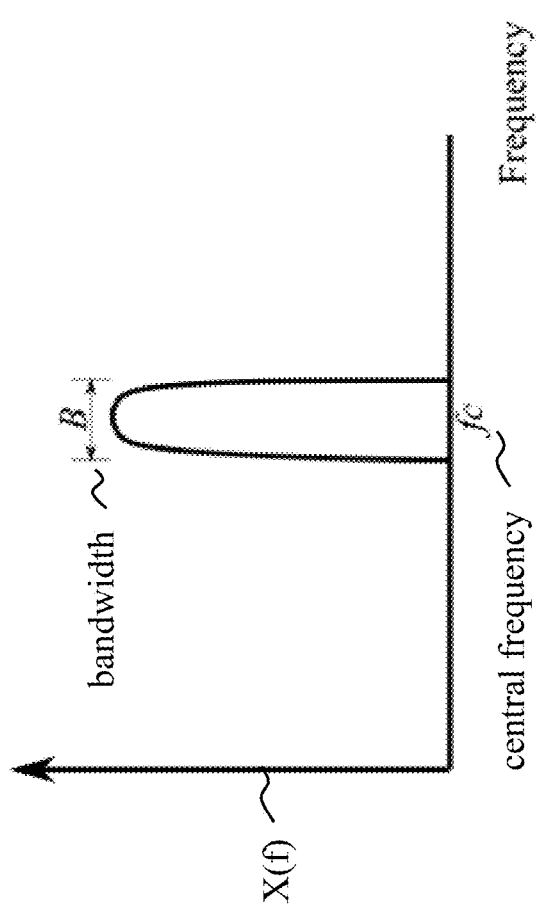
FIG. 5B is a graph illustrating the frequency domain spectrum, X(f), of x(t) of FIG. 5A, according to embodiments of the present disclosure.

FIG. 5B is a graph illustrating the frequency domain spectrum, X(f), of x(t) of FIG. 5A, according to embodiments of the present disclosure.

FIG. 6A is a schematic illustrating a waveform of a periodic signal c(t), which is a square wave, wherein this signal can be used as a time control signal, according to embodiments of the present disclosure. Such that c(t) is the control sequence of the SMPT 114A, 114B, 114N in FIG. 1C.

FIG. 6B is a schematic illustrating the spectrum, C(f), of c(t) of FIG. 6A, in a frequency domain, according to embodiments of the present disclosure. For example, $T_c$ is the period of the square wave, and $T_w$ is the pulse width of the square wave. In the frequency domain, the spectrum of c(t) is a series of delta signals with $1/T_c$ spacing.

Still referring to FIG. 6A, wherein mathematically c(t) can be expressed as follows:

$$c(t) = \sum_k A_k e^{\frac{j2\pi kt}{T_c}}, \qquad \text{Eq. (1)}$$

where $$A_k = \frac{1}{T}\int_T c(t)e^{\frac{-j2\pi kt}{T_c}}\,dt = \frac{2}{k\pi}\sin\!\left(\frac{k\pi T_w}{T_c}\right).$$

Wherein, the Fourier transform of c(t) is given by $$C(f) = \sum_k A_k \delta\!\left(f - \frac{k}{T_c}\right), \qquad \text{Eq. (2)}$$

as is illustrated in FIG. 6B. Another time-delayed square wave, delayed by pr, may have $$c_{p\tau}(t) = \sum_k A_{k,p\tau} e^{\frac{j2\pi k t}{T_c}},\qquad\text{Eq. (3)}$$

where p is an integer value, and $$A_{k,p\tau} \equiv A_k e^{\frac{-j2\pi k p\tau}{T_c}},$$

Upon applying $A_{k,p\tau}$, we have an alternative expression for $$c_{p\tau}(t) = \sum_k A_k e^{\frac{-j2\pi k p\tau}{T_c}} e^{\frac{j2\pi k t}{T_c}},$$

which results in the Fourier transform as follows:

$$C_{p\tau}(f) =\qquad\text{Eq. (4)}$$
$$\sum_k A_k e^{\frac{-j2\pi k p\tau}{T_c}} \delta\left(f - \frac{k}{T_c}\right) = \sum_k \frac{2}{k\pi} \sin\left(\frac{k\pi T_w}{T_c}\right) e^{\frac{-j2\pi k p\tau}{T_c}} \delta\left(f - \frac{k}{T_c}\right),$$

which means that the time delay causes an additional phase rotation of the impulse pulse trains. A different phase rotations depends on k.

FIG. 7A is a schematic illustrating the signal y(t)=x(t)c(t), having only a limited time duration, $T_w$, x(t) that is transmitting, according to embodiments of the present disclosure.

For example, the multiplication in time domain is equivalent to the convolution in frequency. The Fourier transform, Y(f), of y(t) is given by $$Y(f) = x(f) \otimes c(f) = x(f) \otimes \sum_k A_k \delta\left(f - \frac{k}{T_c}\right) = \sum_k A_k x\left(f - \frac{k}{T_c}\right).$$

FIG. 7B is a schematic illustrating the spectrum, Y(f), of y(t) in the frequency domain, according to embodiments of the present disclosure. Such that y(t) is the output of the SPMT, 114A, 114B, 114N in FIG. 1C.

Figure 8A:
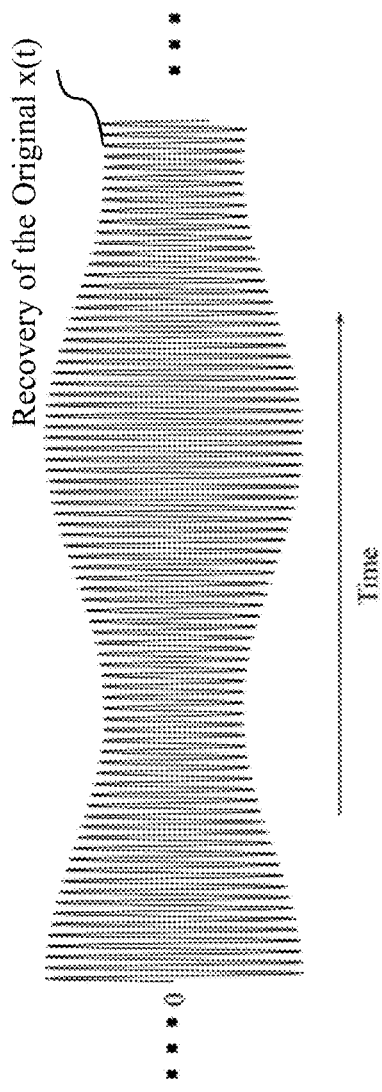
FIG. 8A is a schematic illustrating the fully recovered RF signal, according to embodiments of the present disclosure.

FIG. 8A is a schematic illustrating the fully recovered RF signal after the band-pass filter 116A, 117A, 118A in FIG. 1C, according to embodiments of the present disclosure.

Figure 8B:
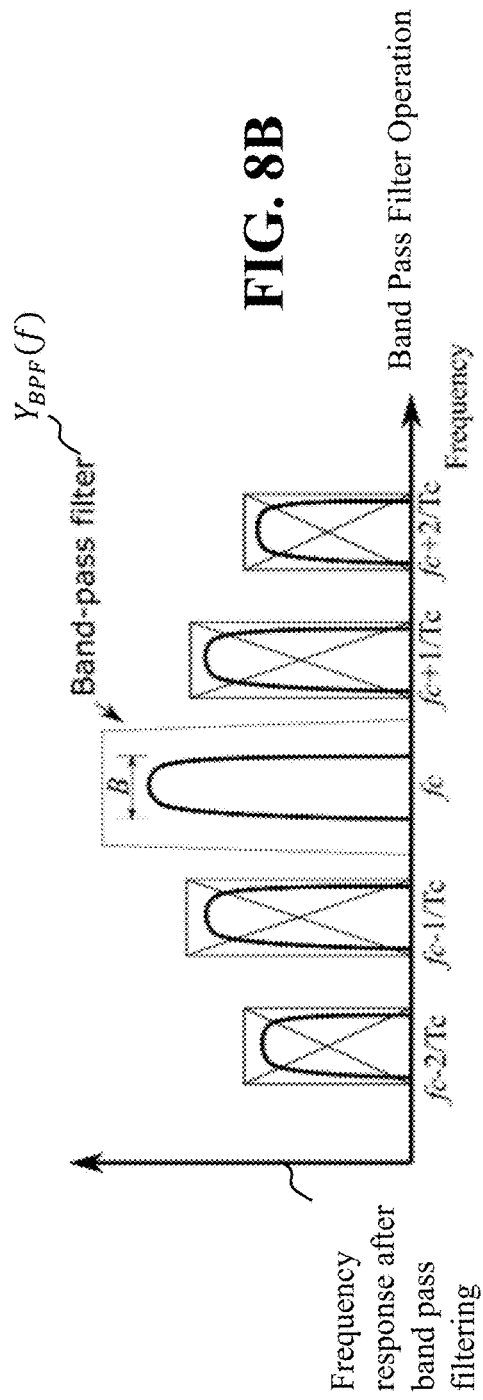
FIG. 8B is a schematic illustrating the frequency spectrum of recovering the RF signal, according to embodiments of the present disclosure.

FIG. 8B is a schematic illustrating the frequency spectrum of recovering the RF signal, according to embodiments of the present disclosure;

Upon review of FIG. 8B, that in order to fully recover x(t), it is possible to apply a band-pass filter as shown in FIG. 8B, which corresponds to $$Y(f) = \sum_k A_k x\left(f - \frac{k}{T_c}\right) \text{ at } k = 0, \text{ so that } Y_{BPF}(f) = A_0 x(f).$$

Still referring to FIG. 8B, similarly, for $c_{p\tau}(t)$, we have $$Y_{p\tau}(f) = X(f) \otimes c_{p\tau}(f) =$$
$$X(f) \otimes \sum_k A_k e^{\frac{-j2\pi k p\tau}{T_c}} \delta\left(f - \frac{k}{T_c}\right) = \sum_k A_k e^{\frac{-j2\pi k p\tau}{T_c}} x\left(f - \frac{k}{T_c}\right).$$

The band-pass filter outputs are given by $Y_{p\tau,BFP}(f)=A_0 X(f)$. Thus, a time delayed square wave can generate the same BPF outputs as the original square wave.

Figure 9:
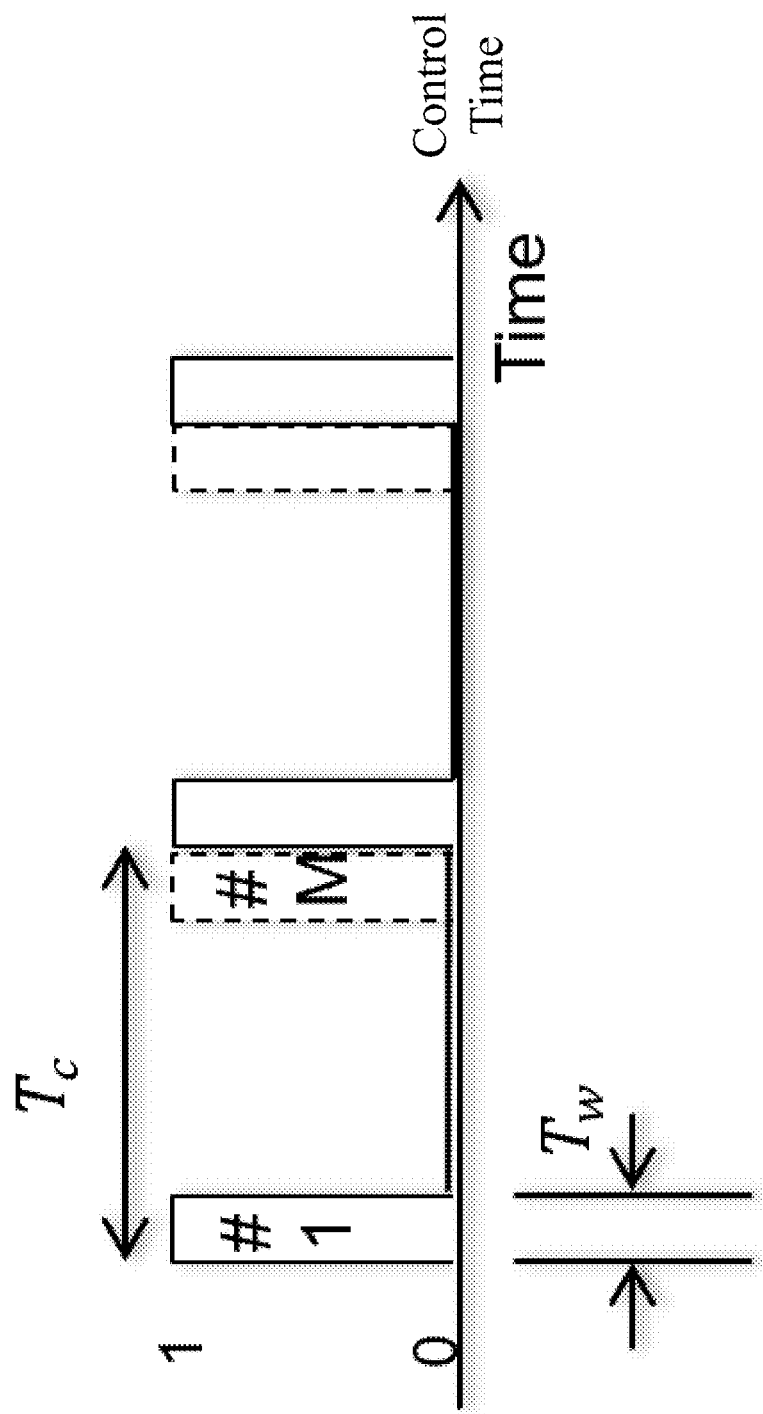
FIG. 9 is a schematic illustrating the time control sequences for different RF chains, according to embodiments of the present disclosure.

FIG. 9 is a schematic illustrating the time control sequences for different RF chains, according to embodiments of the present disclosure. Wherein, it should also be noted that the bandwidth B and the period of the square wave Tc should satisfy the following criteria for fully recovery:

$$1/T_c > B.\qquad\text{Eq. (5)}$$

Also, with the $T_w$ which specifies the switching speed, we define the number of channels M from $$T_c = MT_w.\qquad\text{Eq. (6)}$$

From Eq. (5) above, we can compute the maximum allowable bandwidth by replacing $T_c$ with the relationship given by Eq. (6)

$$\frac{1}{T_c} \geq B \rightarrow \frac{1}{MT_w} \geq B \rightarrow B \leq \frac{1}{MT_w},\qquad\text{Eq. (7)}$$

Thus, the maximum allowable bandwidth is given by $$B = \frac{1}{MT_w}.$$

In other words, when the switching speed and a target beamforming bandwidth are specified, then we can find the available maximum number of channels by $$M = \text{int}\left(\frac{1}{BT_w}\right),$$

where int(.) denotes the integer value.

Features

Aspects of the present disclosure can include the controller, in response to receiving the AOD, can determine a phase shift value and an amplitude value for each transmitting element in the array of transmitting elements to form a sequence of phase shift values and a sequence of amplitude values corresponding to a sequence of states of the switcher connecting the phase shifter to different transmitting elements. Wherein the controller can control, at each point of time, the phase shifter to change the phase of the input signal according to the sequence of phase shift values and controls, at each point of time, the VGA to change the amplitude of the input signal according to the sequence of amplitude values.

Another aspect of the present disclosure can include the sequence of states of switcher can be predetermined and stored in a memory operatively connected to the controller. Further, an aspect can include a power amplifier connected in series to the phase shifter and the VGA. It is possible an aspect can include for each transmitting element a power amplifier connected in series to the band-pass filter and the antenna.

Another aspect of the present disclosure can include a plurality of RF chains; and a power divider directing the input signal each of the plurality of RF chains. Further, the size M of the array of transmitting elements can be determined by a frequency of the switcher. It is possible another aspect can include the size M of the array of transmitting elements that is less than a frequency of the switcher divided by the bandwidth of the input signal.

Another aspect of the present disclosure can include a plurality of receiving RF chains, a power combiner to combine outputs of each receiving RF chains, a down-converter to down-convert the combined signal, an analog-to-digital converter to convert the down-converted combined signal into a digital domain to produce a digital signal, and a processor to demodulate the digital signal. Further, another aspect may include the transmitter is part of a fifth generation (5G) communication system.

Figure 10:
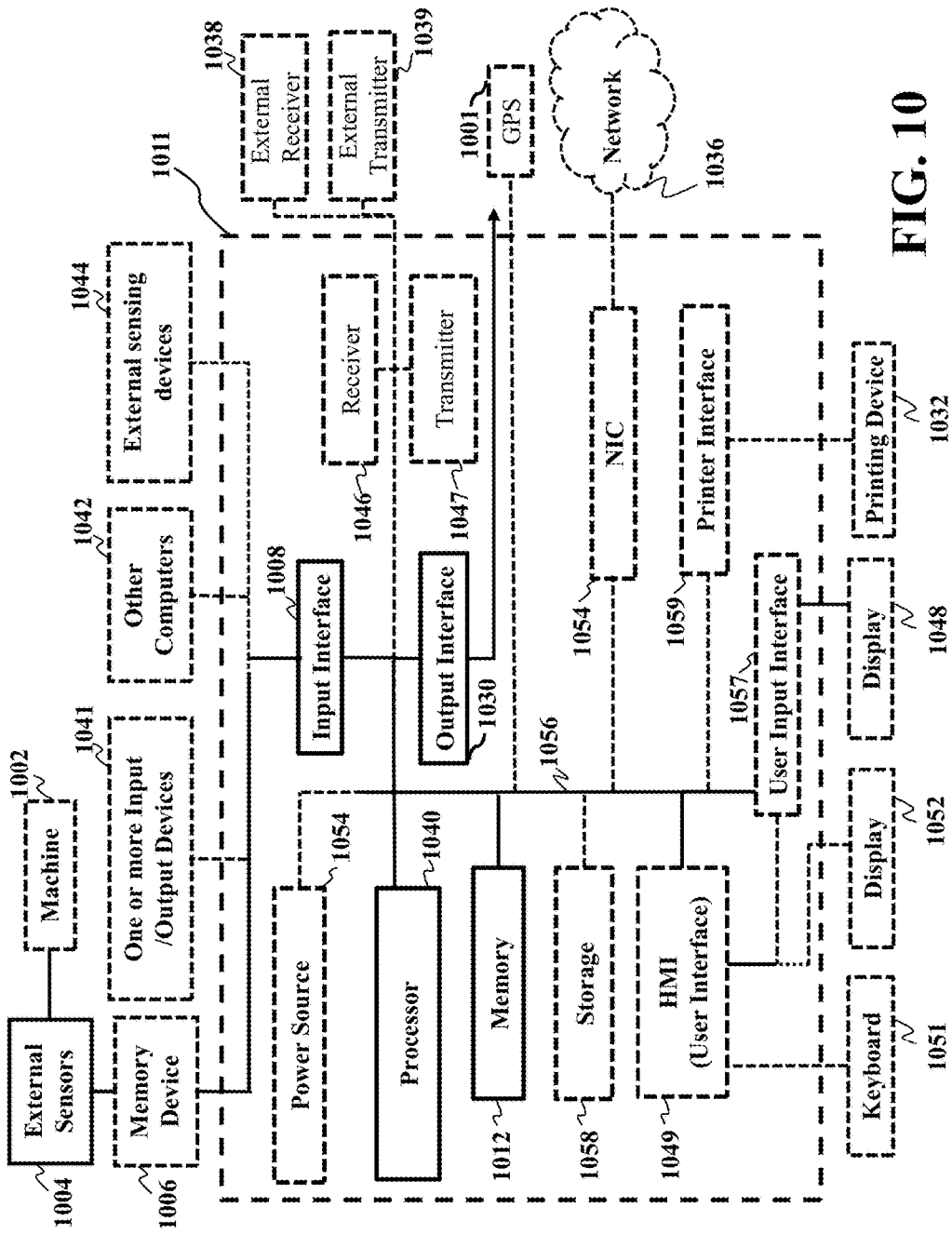
FIG. 10 is a block diagram of illustrating the method of FIG. 1A, that can be implemented using an alternate computer or processor, according to embodiments of the present disclosure.

FIG. 10 is a block diagram of illustrating the method of FIG. 1A, that can be implemented using an alternate controller, according to embodiments of the present disclosure. The controller 1011 includes a processor 1040, computer readable memory 1012, storage 1058 and user interface 1049 with display 1052 and keyboard 1051, which are connected through bus 1056. For example, the user interface 1049 in communication with the processor 1040 and the computer readable memory 1012, acquires and stores the data in the computer readable memory 1012 upon receiving an input from a surface, keyboard surface, of the user interface 1057 by a user.

Contemplated is that the memory 1012 can store instructions that are executable by the processor, historical data, and any data to that can be utilized by the methods and systems of the present disclosure. The processor 1040 can be a single core processor, a multi-core processor, a computing cluster, or any number of other configurations. The processor 1040 can be connected through a bus 1056 to one or more input and output devices. The memory 1012 can include random access memory (RAM), read only memory (ROM), flash memory, or any other suitable memory systems.

Still referring to FIG. 10, a storage device 1058 can be adapted to store supplementary data and/or software modules used by the processor. For example, the storage device 858 can store historical data and other related data as mentioned above regarding the present disclosure. Additionally, or alternatively, the storage device 858 can store historical data similar to data as mentioned above regarding the present disclosure. The storage device 1058 can include a hard drive, an optical drive, a thumb-drive, an array of drives, or any combinations thereof.

The system can be linked through the bus 1056 optionally to a display interface (not shown) adapted to connect the system to a display device (not shown), wherein the display device can include a computer monitor, camera, television, projector, or mobile device, among others.

The controller 1011 can include a power source 1054, depending upon the application the power source 1054 may be optionally located outside of the controller 1011. Linked through bus 1056 can be a user input interface 1057 adapted to connect to a display device 1048, wherein the display device 1048 can include a computer monitor, camera, television, projector, or mobile device, among others. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect through the bus 1056 to a network 1036, wherein data or other data, among other things, can be rendered on a third party display device, third party imaging device, and/or third party printing device outside of the controller 1011.

Still referring to FIG. 10, the data or other data, among other things, can be transmitted over a communication channel of the network 1036, and/or stored within the storage system 1058 for storage and/or further processing. Further, the data or other data may be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. Further, a GPS 1001 may be connected via bus 1056 to the controller 1011. The controller 1011 may be connected via an input interface 1008 to external sensing devices 1044 and external input/output devices 1041. The controller 1011 may be connected to other external computers 1042. Further, the controller 10011 can be connected to external sensors 1004 that is in communication with a machine 1002 and memory device 1006. An output interface 1009 may be used to output the processed data from the processor 1040.

The present description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the present disclosure has been described by way of examples of preferred embodiments, it is to be understood that various other adaptations and modifications can be made within the spirit and scope of the present disclosure. Therefore, it is the object of the appended claims to cover all such variations and modifications as come within the true spirit and scope of the present disclosure.

What is claimed is:

1. A transmitter including at least one radio-frequency (RF) chain, the RF chain comprising:
    an array of transmitting elements, each transmitting element includes a band-pass filter and an antenna connected in series for transmitting an analog signal using a beamforming with an angle of departure (AOD) defined by phase shifts of analog signals received by different transmitting elements within the array of transmitting elements;
    a phase shifter to shift a phase of an input signal;
    a variable gain amplifier (VGA) to change an amplitude of the input signal, wherein the phase shifter and the VGA are connected in series;
    a switcher to connect the phase shifter and the VGA to each transmitting element in the array of transmitting elements, wherein at most one transmitting element is connected to the phase shifter and the VGA at a given point of time, such that the switcher is a single-pole-M-throw (SPMT) analog switch, wherein M is a size of the array of transmitting elements; and
    a controller to control the phase shifter, the VGA and the switcher, such that, at the given point of time, the transmitting element receives a sample of the input signal having a phase and an amplitude determined based on the AOD, and a location of the transmitting element within the array of transmitting elements.

2. The transmitter of claim 1, wherein the controller, in response to receiving the AOD, determines a phase shift value and an amplitude value for each transmitting element in the array of transmitting elements to form a sequence of phase shift values and a sequence of amplitude values corresponding to a sequence of states of the switcher connecting the phase shifter to different transmitting elements, and controls, at each point of time, the phase shifter to change the phase of the input signal according to the sequence of phase shift values and controls, at each point of time, the VGA to change the amplitude of the input signal according to the sequence of amplitude values.

3. The transmitter of claim 1, wherein the sequence of states of switcher is predetermined and stored in a memory operatively connected to the controller.

4. The transmitter of claim 1, further comprising:
    a power amplifier connected in series to the phase shifter and the VGA.

5. The transmitter of claim 1, wherein each transmitting element includes a power amplifier connected in series to the band-pass filter and the antenna.

6. The transmitter of claim 1, further comprising:
    a plurality of RF chains; and
    a power divider directing the input signal each of the plurality of RF chains.

7. The transmitter of claim 1, wherein the size M of the array of transmitting elements is determined by a frequency of the switcher.

8. The transmitter of claim 1, wherein the size M of the array of transmitting elements is less than a frequency of the switcher divided by the bandwidth of the input signal.

9. A receiver in communication with the transmitter of claim 1, wherein a receiving RF chain of the receiver comprises:
    an array of antennas to receive a signal at an angle of arrival (AOA);
    a receiving switcher to activate each antenna from the array of antennas, such that at most one antenna is active at a given point of time, and the switcher is a K-throw-single pole (KTSP) analog switch, wherein K is a size of the array of the antennas to produce a merged signal with different phase shifts and amplitudes;
    a receiving phase shifter to shift a phase of the merged signal;
    a receiving variable gain amplifier (VGA) to change an amplitude of the merged signal, wherein the receiving phase shifter and the receiving VGA are connected in series; and
    a controller to control the receiving phase shifter, the receiving VGA, and the receiving switcher, such that, at the given point of time, the receiving phase shifter and the receiving VGA modify the phase shift and the amplitude of the received signal based on the AOA and a location of the receiving antenna in the array of antennas.

10. The receiver of claim 9, further comprising:
    a plurality of receiving RF chains;
    a power combiner to combine outputs of each receiving RF chains;
    a down-converter to down-convert the combined signal;
    an analog-to-digital converter to convert the down-converted combined signal into a digital domain to produce a digital signal; and
    a processor to demodulate the digital signal.

11. The receiver of claim 9, wherein the transmitter is part of a fifth generation (5G) communication system.

12. A method for transmitting an analog signal by an array of antennas using a beamforming with an angle of departure (AOD) defined by phase shifts of the analog signals transmitted by different antennas, the method comprising:
    determining a phase shift value and an amplitude value for each antenna in the array of antennas based on the AOD and a location of each antenna in the array;
    ordering the phase shift values according to a sequence of activation of the antennas in the array to form a sequence of phase shifts;
    ordering the amplitude values according to the sequence of activation of the antennas in the array to form a sequence of amplitudes;
    modifying the phase and the amplitude of an analog signal according to values in the sequence of phase shifts and in the sequence of amplitudes;

sampling the modified analog signal and directing the samples to different antennas in an order governed by the sequence of activation of the antennas; and band-passing each sample directed to each antenna to produce a modified copy of the analog signal for each antenna; and transmitting the modified copies of the analog signal from the corresponding antennas.

13. A transmitter including at least two radio-frequency (RF) chains, the transmitter comprising:

each RF chain including:

an array of transmitting elements, each transmitting element includes a band-pass filter and an antenna connected in series for transmitting an analog signal using a beamforming with an angle of departure (AOD) defined by phase shifts of analog signals received by different transmitting elements within the array of transmitting elements;

a phase shifter to shift a phase of an input signal;

a variable gain amplifier (VGA) to change an amplitude of the input signal, wherein the phase shifter and the VGA are connected in series;

a switcher to connect the phase shifter and the VGA to each transmitting element in the array of transmitting elements, wherein at most one transmitting element is connected to the phase shifter and the VGA at a given point of time, such that the switcher is a single-pole-M-throw (SPMT) analog switch, wherein M is a size of the array of transmitting elements; and a controller to control the at least two RF chains, by controlling at least two phase shifters, at least two VGAs, and at least two switchers, such that, at the given point of time, at least two transmitting elements from the at least two RF chains, receive a sample of the input signal having a phase and an amplitude determined based on the AOD of the array, and a location of the at least two transmitting elements within the array of transmitting elements of the at least two RF chains.

14. The transmitter of claim 13, wherein the controller, in response to receiving the AOD of the array, determines a phase shift value and an amplitude value for each transmitting element in the array of transmitting elements to form a sequence of phase shift values and a sequence of amplitude values corresponding to a sequence of states of the switcher connecting the phase shifter to different transmitting elements, and controls, at each point of time, the phase shifter to change the phase of the input signal according to the sequence of phase shift values and controls, at each point of time, the VGA to change the amplitude of the input signal according to the sequence of amplitude values.

15. The transmitter of claim 13, wherein the different transmitting elements within the array of transmitting elements are determined by a location of the transmitting elements.

16. The transmitter of claim 13, wherein the transmitter is part of a fifth generation (5G) communication system.

17. The transmitter of claim 13, wherein the sequence of states of switcher is predetermined and stored in a memory operatively connected to the controller.

18. The transmitter of claim 13, further comprising:

a power amplifier connected in series to the phase shifter and the VGA, such that each transmitting element includes the power amplifier connected in series to the band-pass filter and the antenna.

* * * * *